United States Patent
Nikiel et al.

(10) Patent No.: US 6,182,008 B1
(45) Date of Patent: Jan. 30, 2001

(54) ORDERING DESTINATIONS ALONG A ROUTE USING A SHORTEST LINE APPROXIMATION

(75) Inventors: Mark A. Nikiel; Nicholas Berry, both of Redmond, WA (US)

(73) Assignee: Microsoft Corporation, Redmond, WA (US)

(*) Notice: Under 35 U.S.C. 154(b), the term of this patent shall be extended for 0 days.

(21) Appl. No.: 09/344,437

(22) Filed: Jun. 25, 1999

(51) Int. Cl.[7] .......................... G06F 165/00; G06F 17/30
(52) U.S. Cl. ........................ 701/202; 701/26; 701/201; 701/208; 701/209; 340/990; 73/178 R
(58) Field of Search ...................... 701/202, 208, 701/25, 26, 201, 209; 340/990, 995; 707/1, 100; 73/178 R

(56) References Cited

U.S. PATENT DOCUMENTS

| | | | | |
|---|---|---|---|---|
| 5,963,948 | * | 10/1999 | Shilcrat | 707/100 |
| 5,964,821 | * | 10/1999 | Brunts et al. | 701/201 |
| 5,978,733 | * | 11/1999 | Deshimaru et al. | 701/209 |

\* cited by examiner

*Primary Examiner*—William A. Cuchlinski, Jr.
*Assistant Examiner*—Yonel Beaulieu
(74) *Attorney, Agent, or Firm*—Christensen O'Connor Johnson Kindness PLLC

(57) ABSTRACT

A computer-implementable method for ordering destinations to be visited in a computationally-efficient manner and which achieves an acceptable level of optimization of the order for those destinations is disclosed. The computer-implementable method orders destinations to be visited by identifying the position in an existing order of destinations where the insertion of a new destination will result in the shortest increase to the straight-line length of the route. More specifically, a single, continuous line connects each of the destinations to be visited. The continuous line is composed of multiple "links." Each link is a straight line connecting two destinations. The total length of the continuous line is the sum of the lengths of each link. The order of the destinations defines the order in which the continuous line visits each destination. A new destination is added at a position in the existing order of destinations that results in the shortest increase to the straight-line length of the continuous line.

24 Claims, 8 Drawing Sheets

ORDERING DESTINATIONS ALONG A ROUTE USING A SHORTEST LINE APPROXIMATION

FIELD OF THE INVENTION

The present invention relates to computerized mapping software programs, and more specifically, to computerized mapping software programs that calculate a route between multiple destinations and allow alterations to the calculated route.

BACKGROUND OF THE INVENTION

Computerized mapping products are achieving widespread use today. Such mapping programs are commonly used to automate the task of calculating a route from a starting destination to an ending destination. In addition, most mapping programs allow a user to include additional destinations to be visited along the route. Developers of computerized mapping programs are plagued by the problem of ordering the destinations to be visited along the route. More specifically, in the past, developers of computerized mapping programs have had problems providing a mechanism for determining the order in which destinations are visited along the route prior to calculating a route that visits all of the destinations. This problem is sometimes referred to as the "traveling salesman" problem.

In the past, some mapping programs have avoided the problem altogether. Those mapping programs simply calculate a route that visits each destination in the order in which the destinations are provided by a user. That solution is the least optimal because a user rarely provides destinations along a route in an optimal sequence. More likely, a user will simply provide destinations to be visited in a stream-of-consciousness manner. The result may be that the calculated route is substantially longer than optimal.

Other mapping programs address the problem by not ordering the destinations until all of the destinations are input, and then calculating an optimal order for all of the destinations. There are several problems with this approach as well. For example, calculating the true optimal order for the destinations requires comparing each and every possible order of the destinations. That calculation is manageable with three or four destinations, but as the number of destinations increases, the number of calculations necessary quickly overwhelms the computing power of any conventional computer. Consequently, many techniques have been developed to approximate the true optimal solution, such as simulated annealing and other such techniques that result in a highly optimal order for the destinations.

Unfortunately, those techniques still have the disadvantage that they are computationally intensive. The number of computations required to solve the travelling salesman problem still grows rapidly (non-linearly) with the number of destinations. Users of mapping programs do not typically like to wait long periods of time while a mapping program simply orders destinations to be visited even prior to calculating the optimal route. For that reason, if a user inputs several destinations to be visited, using a technique that calculates a highly-optimal order for the destinations introduces unwanted delay.

That undesirable feature of prior mapping programs is particularly undesirable to users that remove or add destinations to an existing list because existing mapping programs, which operate on all of the destinations at once, require a complete reorder of all destinations each time a single new destination is added.

These and other problems render the existing systems and methods less than satisfactory. Until now, a solution to those problems has eluded those skilled in the art. Accordingly, there is a need for a system or method of ordering destinations to be visited that is computationally efficient and achieves an acceptable order based on the total length of a route connecting all of the destinations.

SUMMARY OF THE INVENTION

The present invention overcomes the problems identified above by providing a computer-implementable method of ordering destinations to be visited in a manner that is computationally-efficient and provides an acceptable level of optimization. This is achieved by building the route one destination at a time. As each destination to be visited is added, the method positions it within an existing order of destinations such that the new order results in the shortest increase to the straight-line length of the route. More specifically, a single, continuous line connects each of the destinations to be visited. The continuous line is composed of multiple "links." Each link is a straight line connecting two destinations. The total length of the continuous line is the sum of the lengths of each link. The order of the destinations defines the order in which the continuous line visits each destination.

A list is maintained that includes all of the existing destinations sorted in the order in which each destination is to be visited. When a new destination to be visited is added, a new list is generated that includes the new destination. Preferably, the new list orders all the destinations, including the new destination, such that the new destination is visited in an efficient manner along the route. The present invention overcomes the limitations of the prior art by inserting the new destination between two existing destinations without otherwise reordering the existing destinations. Then the existing link between a first existing destination and a second existing destination is replaced with two new links: (1) one link from the first existing destination to the new destination, and (2) a second link from the new destination to the second existing destination. This method results in essentially a single change (replacing only one existing link) to the existing order of destinations. By only making this single change, the present invention drastically reduces the computational time required for the reordering of destinations. In this manner, the present invention overcomes many of the problems identified in the prior art.

The present invention identifies which existing link to replace in the following manner. When the new destination is input, the present invention calculates the straight-line lengths of two new links: (1) a first new link from the currently-first destination in the list of existing destinations, and (2) a second new link from the new destination to the currently-second destination in the list of existing destinations. That value is stored for comparison.

Next, the present invention replaces the link between the currently-second existing destination and the currently-third existing destination with two other new links: (1) a new first link between the second existing destination and the new destination, and (2) a new second link from the new destination to the third existing destination. Again, the invention subtracts from the sum of those two lengths the length of a straight line connecting the currently-second destination with the currently-third destination. The value of that subtraction represents the straight-line impact on the route of inserting the new destination between the currently-second destination and the currently-third destination. If that calculated value is shorter than the value stored during the previous iteration, then the current iteration is identified as preferable.

Those computations are repeated for each subsequent link between existing destinations. When all of the links between existing destinations have been tested, the present invention has identified as preferable one existing link which, when replaced with two links to and from the new destination, results in a shortest total length for the continuous line that connects all of the destinations. Finally, the present invention creates a new order for all the destinations by inserting the new destination between existing destinations identified as preferable. In this manner, a new list is created that orders each of the destinations, including the new destination, such that the continuous line visiting the destinations in the listed order is the shortest.

Additionally, the present invention may evaluate whether it would be preferable to insert the new destination at either the beginning of the list or at the end of the list. In other words, the single change made by the present invention to minimize the total line length connecting all of the destinations may include adding a new link between the new destination and either the existing first destination or the existing last destination. In either of those situations, the present invention calculates the straight-line distances between the new destination and the currently-first destination, and the new destination and the currently-last destination. If either of those distances is less than the impact corresponding to the preferable position calculated above, then the new destination is inserted in either the beginning or ending position, whichever resulted in the shorter distance.

One advantage of the present invention is that the route between all of the destinations need not be completely recalculated. Only the portion of the route spanning the link that was replaced need be recalculated. In other words, if the new destination is inserted between existing destination three and existing destination four, only the portion of the route that connected existing destinations three and four need be recalculated to reflect the new destination. Consequently, not only does the present invention shorten the total computational time for ordering the destinations to be visited, the computational time for recalculating a new route including the new destination is shortened as well.

It will be apparent to those skilled in the art that the order derived by the present invention may not achieve an absolute shortest line connecting all of the destinations. In other words, the application of a more computationally intensive algorithm could possibly result in a shorter continuous line connecting all of the destinations. However, the performance burden of performing such a computationally intensive algorithm to achieve the absolute shortest line, if even possible, greatly outweighs any diminished optimization resulting from the present invention. Therefore, the present invention provides a computationally-efficient method of optimizing the order in which destinations are visited when planning a route on a computerized mapping program.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to a computer-implementable method for ordering destinations along a route using a shortest line approximation. Briefly described, the invention identifies the position in an existing order of destinations where the insertion of a new destination will result in the shortest increase to the straight-line length of the route. The present invention may be embodied in a mapping program, such as the "Expedia Streets & Trips 2000" mapping program owned and licensed by the Microsoft Corporation of Redmond, Wash.

Figure 1:
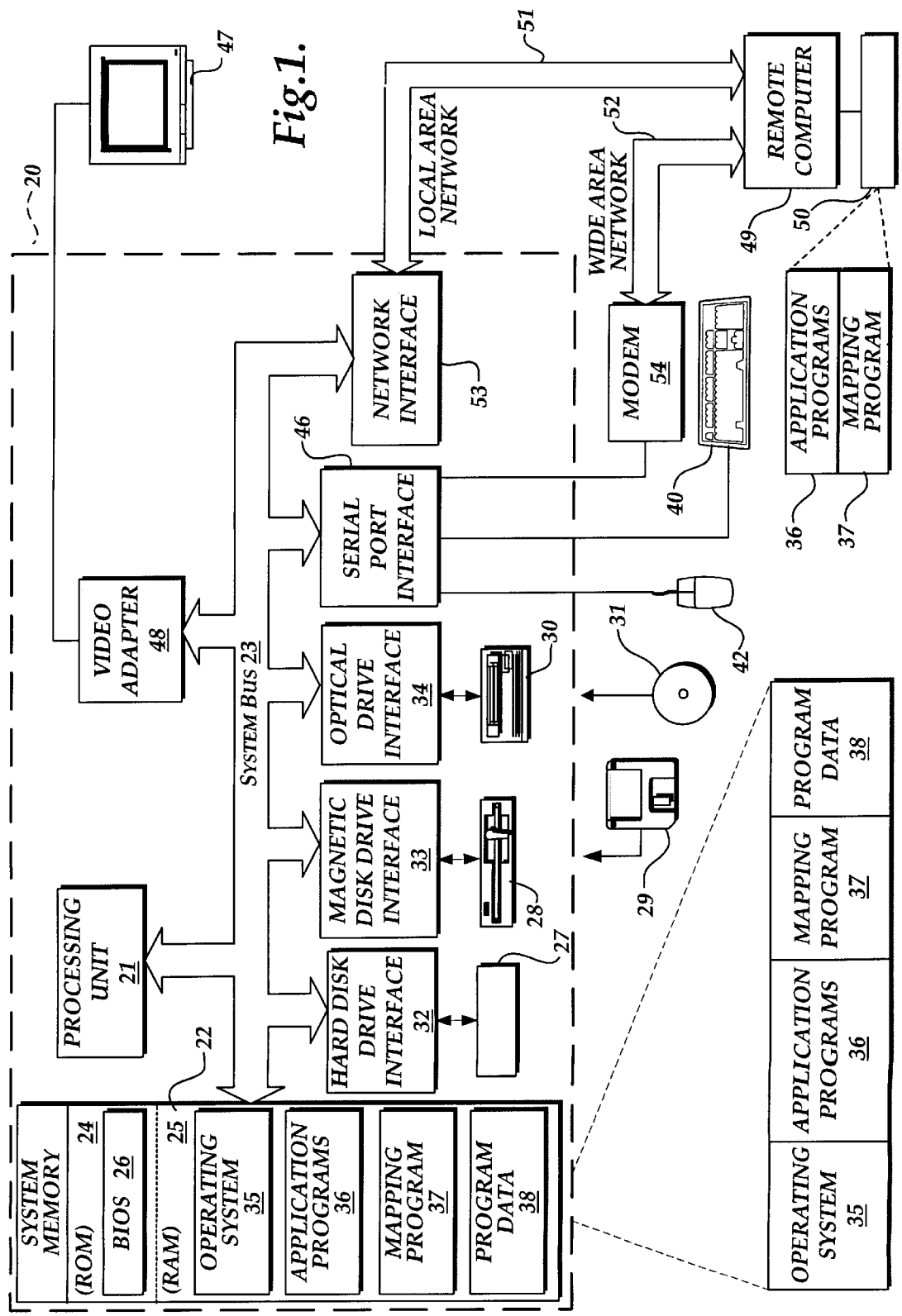
FIG. 1 is a block diagram of a computer suitable for providing an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during startup, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 25, including an operating system 35, one or more application programs 36, a computer mapping program 37, such as the Expedia Streets & Trips 2000 program mentioned above, having one embodiment of the present invention, and program data 38. A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
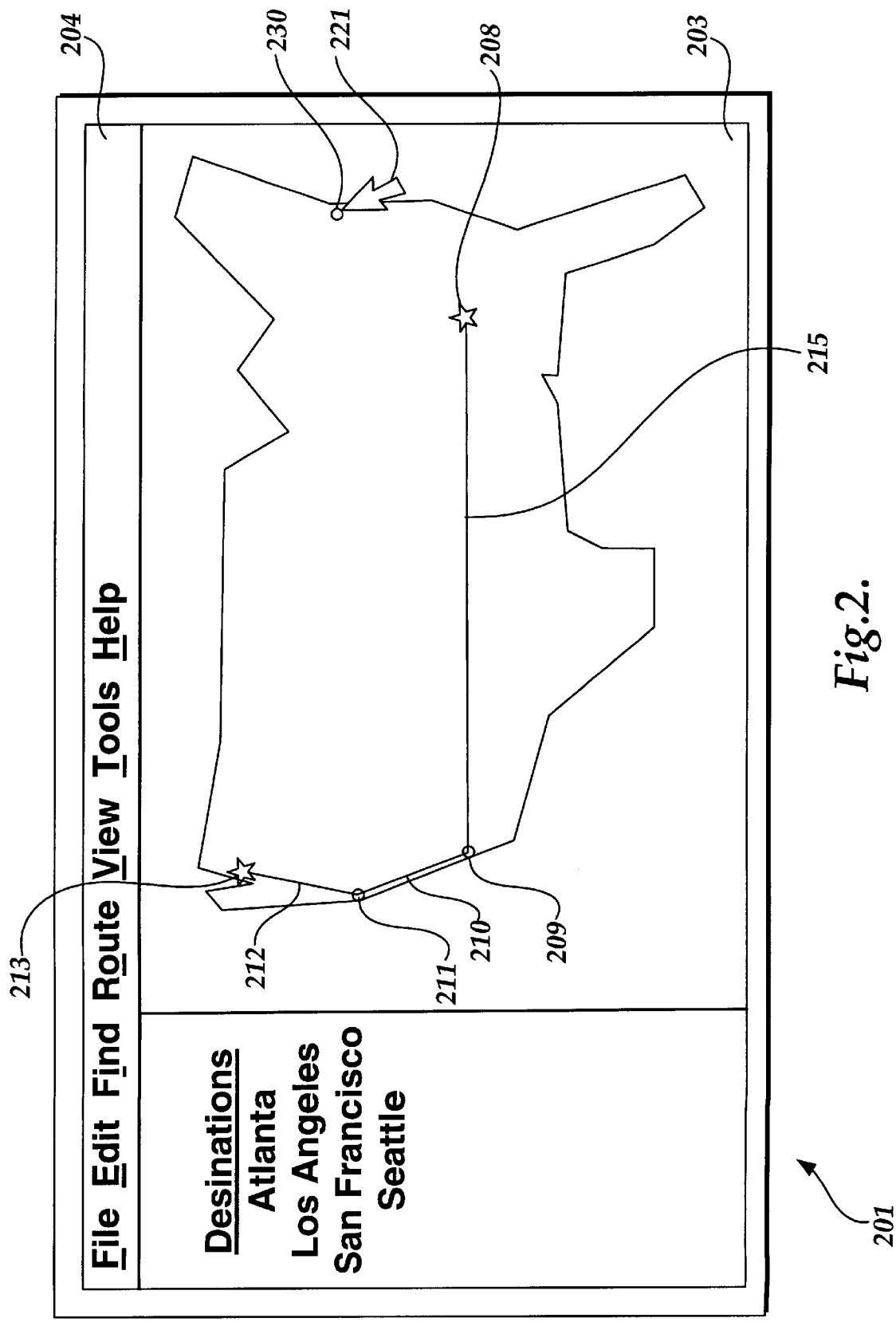
FIG. 2 is an exemplary screen display of one embodiment of the present invention illustrating a route connecting several destinations and including a new destination to add to the route.

The present invention is best described by example. FIGS. 2–6 graphically illustrate one embodiment of the present invention as it performs exemplary functions enabled by the present invention. In a sequence of sample screen shots, FIGS. 2 and 4 illustrate the commonly-performed function of adding a destination to an already-calculated route. In the following examples, the mapping program 37 receives an input identifying a new destination and orders the destinations such that the new destination is included in an appropriate place along the route. In this example, the pre-calculated route begins in Atlanta, proceeds through other destinations, and continues to Seattle.

FIG. 2 is an illustrative screen display 201 of the mapping program 37 with a sample map 203 displayed below a menu bar 204. Identified on the map 203 are several destinations: Atlanta 207, Los Angeles 209, San Francisco 211, and Seattle 213. In this example, Atlanta 207 and Seattle 213 are identified with stars to indicate that they represent the starting destination and ending destination, respectively, of the route. The other destinations are illustrated as small circles. The route has been calculated that travels from Atlanta 207 to Seattle 213 through Los Angeles 209 and San Francisco 211. Each line connecting two destinations is termed a "link." The route is illustrated as the series of links, such as link 215, that connect the several destinations. Those skilled in the art will appreciate that the links are typically not straight lines but rather follow the topography of the roadways calculated to connect two destinations. However, for simplicity of description only, the links are illustrated as straight lines in these examples.

The screen display 201 also includes a listing portion 205 having a list of the existing destinations along the route. The listing portion 205 details those destinations that have been identified through input from the user and are displayed on the map 203. The list of existing destinations is sorted in the order in which the destinations are visited along the route. Also shown is a pointer 221 under the control of an input device, such as the mouse 42 or a touchpad.

FIG. 2 illustrates the situation where a user has already input several destinations and caused the mapping program 37 to calculate the route along those several destinations. The mapping program 37 has generated and displayed a graphical representation of the route traveling to each of the several destinations. Those skilled in the art will appreciate that several alternative forms of display are possible. For example, often mapping programs will display a textual description of the route including detailed driving instructions from destination to destination. A graphical representation has the advantage of providing the user with a more conceptual overview of the route. Mapping programs that perform only those functions (i.e., graphically represent a calculated route between destinations) are known in the art and do not per se form a part of the present invention.

At this juncture, the user may often decide to modify the calculated route by including an additional destination to visit. For example, the user may desire to include New York 230 as a new destination along the route. In this example, the user may identify New York 230 as a new destination by navigating the pointer 221 to the point on the map 230 that represents New York and selecting that point with the mouse 42. Alternatively, the user may input New York 230 through a textual input screen, such as a dialog box or the like. There are many mechanisms available to indicate the user's desire to add a new destination to the route, and any of those mechanisms is applicable to the present invention. The screen display 201 illustrates a snapshot of the map 203 just before the mapping program 37 reorders the destinations to include the new destination New York 230.

Once the user has indicated a desire to include New York 230 as a new destination, the mapping program 37 reorders the destinations so that the new route includes New York 230 in a reasonable sequence. In other words, after the user includes New York 230 as a destination, the mapping program 37 determines where in the list of existing destinations to insert the new destination such that the route is reasonably efficient. Because of the limitations of existing technologies, the calculations necessary to determine the ideal order for the destinations results in an undesirable delay to the user. This embodiment of the invention allows the mapping program 37 to order the locations much quicker than the existing technologies while achieving an acceptable level of efficiency for the route. The computations involved with determining that order are illustrated in FIGS. 3A–3C and described below.

This embodiment of the invention limits the number of changes that can be made to the pre-calculated route to one. By invoking that constraint, the mapping program 37 is able to greatly reduce the number of calculations performed when determining the order of the destinations. The present invention will still achieve benefits over the existing technologies if numerical constraints other than one are used, but the performance improvement achieved degrades as the numerical constraint increases. For the purpose of this discussion, the term "change" means replacing an existing link between two destinations. In other words, given the current order of destinations, the mapping program 37 seeks to insert the new destination between two existing destinations in the current order. The result is that the link between the two existing destinations is replaced with two new links joining the new destination to the two existing destinations. How this determination is made is graphically depicted in FIGS. 3A–3C.

The goal of this embodiment of the invention is to identify which link, if replaced, results in the shortest increase in a continuous line that connects all of the destinations, including the new destination. FIGS. 3A–3C graphically depict the computations performed by the mapping program 37 to determine the single change that will result in adding the new destination in the most efficient position. Those figures illustrate the relative locations of each of the destinations illustrated in FIG. 2 along with links joining the destinations in the order visited by the route.

Figure 3A:
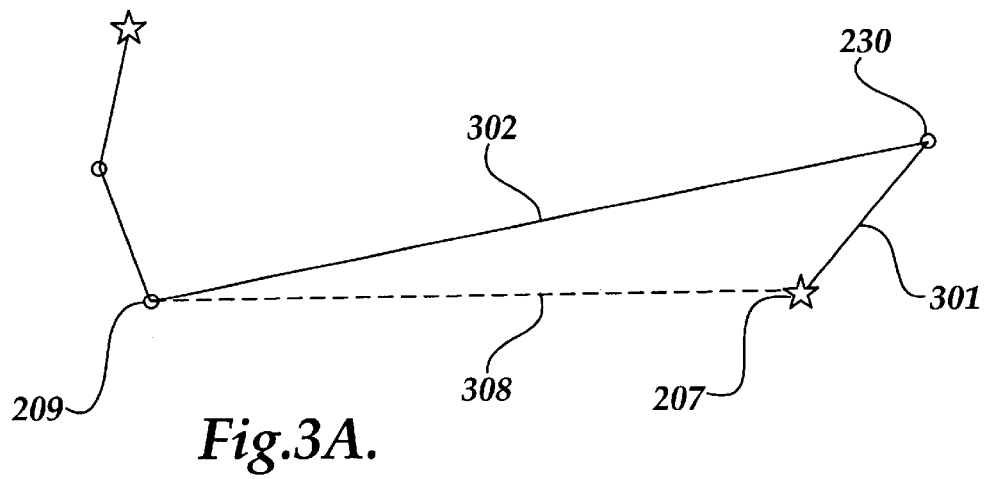
FIGS. 3A–C are graphical representations of the embodiment illustrated in FIG. 2 performing calculations to identify a preferable position to insert the new destination.
Figure 3B:
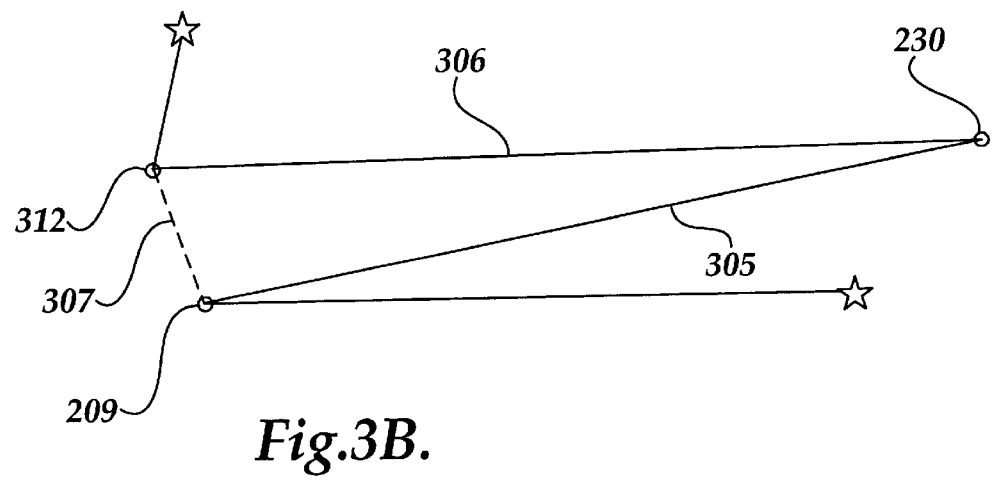
Figure 3C:
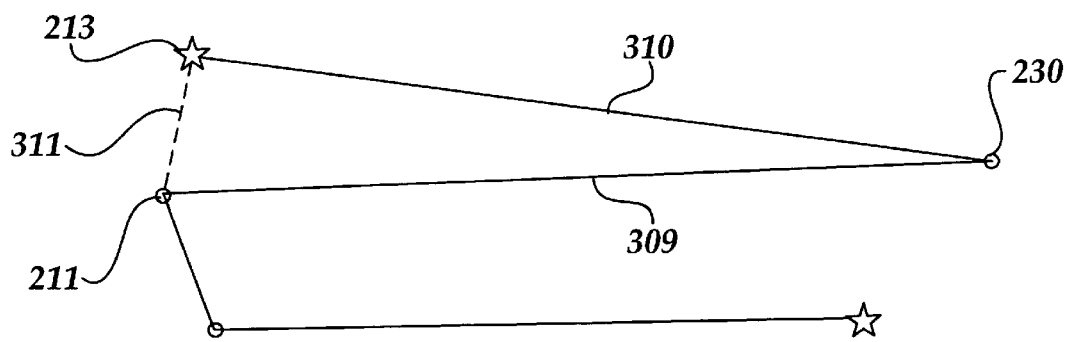
Figure 4:
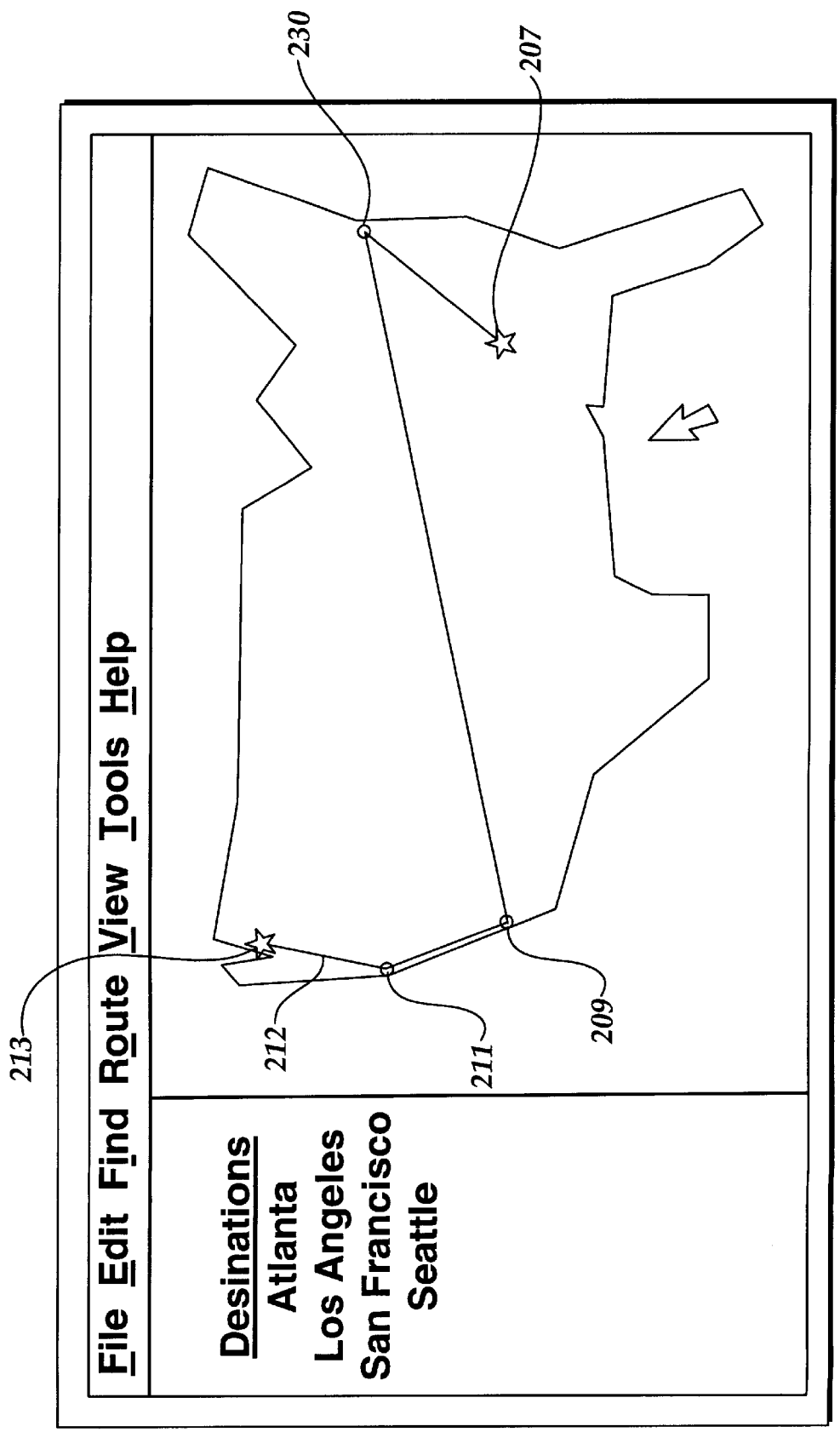
FIG. 4 is another exemplary screen display of one embodiment of the present invention illustrating a route connecting several destinations after including the new destination in the preferable position.

In FIG. 3A, the mapping program 37 begins by calculating the straight-line impact on the route of replacing the link between Atlanta 207 and Los Angeles 209. The mapping program 37 calculates the lengths of a line 301 between Atlanta 207 and New York 230, and a line 302 between New York 230 and Los Angeles 209. The distance 303 between the two existing destinations is subtracted from the sum of the lengths of those two lines (301, 302). The resulting length is the straight-line length that the route would be increased by inserting the new destination between the two existing destinations. That length is stored as a variable "ShortestDistance" for comparison.

In FIG. 3B, the mapping program 37 repeats the above calculation for the link 210 between Los Angeles 209 and San Francisco 211. The mapping program 37 calculates the lengths of a line 305 between Los Angeles 209 and New York 230, and a line 306 between New York 230 and San Francisco 211. The straight-line distance 307 between Los Angeles 209 and San Francisco 211 is subtracted from the sum of the lengths of those two lines (305, 306). The length resulting from that subtraction is then compared to the variable ShortestDistance from above. The shorter length is again stored as the variable ShortestDistance, and the link corresponding to the shorter length is identified as replaceable. In this example, the added length of lines (301, 302) is shorter than the added length of lines (305, 306). Therefore, the added length of lines (301, 302) is retained for comparison, and the corresponding link 215 (FIG. 2) is identified as replaceable.

Finally, in FIG. 3C, the mapping program 37 repeats the calculation for the link 212 between San Francisco 211 and Seattle 213. The mapping program 37 calculates the lengths of a line 309 between San Francisco 211 and New York 230, and a line 310 between New York 230 and Seattle 213. The straight-line distance 311 between San Francisco 211 and Seattle 213 is subtracted from the sum of the lengths of those two lines (309, 310). The resulting length is compared to the variable ShortestDistance. Again, the shorter length is stored as the variable ShortestDistance, and the link corresponding to the shorter length is identified as replaceable. In this example, the added length of lines (301, 302) is still shorter than the added length of lines (309, 310). Accordingly, the added length of lines (301, 302) is retained and associated with link 215.

After evaluating the link between San Francisco 211 and Seattle 213, the mapping program 37 is finished with the calculations, and the link corresponding to the shortest set of lines is identified as replaceable. In this example, lines (301, 302) result in the shortest added length and therefore will impact the total length of the continuous line connecting all of the destinations the least. Accordingly, link 215 corresponding to lines (301, 302) is deleted, and the new destination New York 230 is inserted in the list of existing destinations between the two destinations, Atlanta 207 and Los Angeles 209, previously connected by link 215.

FIG. 4 illustrates the end result of including New York 230 in the route between Atlanta 207 and Los Angeles 209. The newly calculated route begins in Atlanta 207, proceeds through New York 230, Los Angeles 209, and San Francisco 211, and then ends in Seattle 213. The name "New York" may also be included in the appropriate position in the list of destinations displayed in the listing portion 205.

In some situations, the mapping program 37 may additionally compute whether to add the new destination at the beginning or end of the route. In the previous example, Atlanta 207 and Seattle 213 were identified as the beginning and ending destinations of the route. For that reason, the new destination New York 230 could not be added to either the beginning of the route or the end of the route. However, it is possible to have a route that does not have a fixed beginning or ending destination. For example, returning to FIG. 2, it is not necessary that Atlanta 207 and Seattle 213 be identified as the beginning and ending destinations of the route. Perhaps the user simple desires to visit the identified destinations, but in any order that results in an efficient route, or has yet to decide the start or end locations for the trip. In those cases, when New York 230 is added as a new destination, the mapping program 37 is free to determine whether to begin or end the route at New York 230. That particular situation is illustrated in FIGS. 5A–5B, and described below.

Figure 5A:
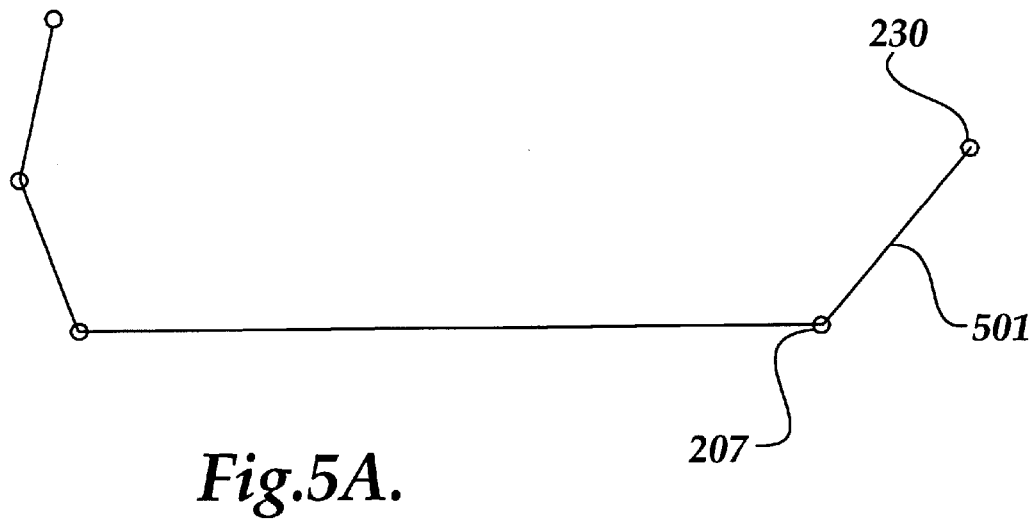
FIGS. 5A–5B are graphical representations of the embodiment illustrated in FIG. 2 performing calculations to identify another preferable position to insert the new destination.
Figure 5B:
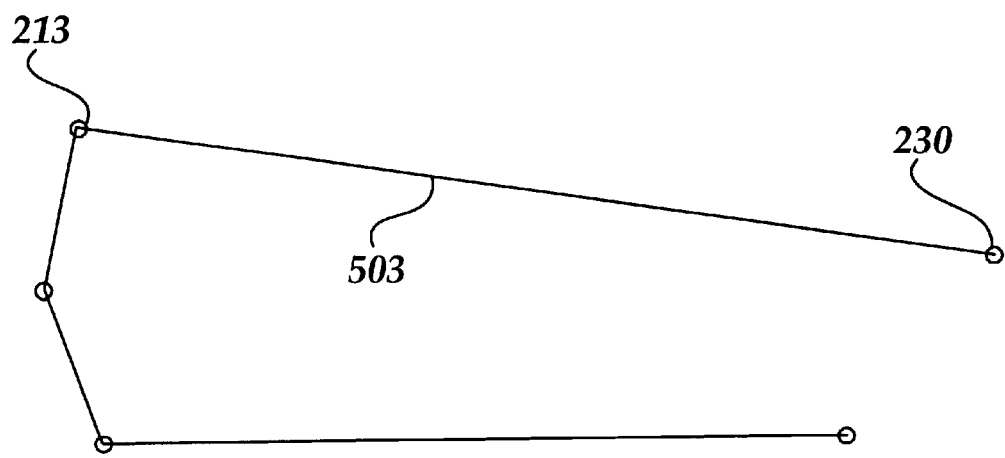

FIGS. 5A–5B again illustrate the relative locations of each of the destinations illustrated in FIG. 2. However, in this example, Atlanta 207 and Seattle 213 were not originally identified as the beginning or ending destinations of the route. Therefore, the mapping program 37, in addition to the calculations performed above, determines whether adding the new destination New York 230 to the beginning or end of the existing route results in a preferable order. In other words, if the existing route does not have a fixed beginning or ending destination, the mapping program 37 is free to include the new destination as the new beginning or new ending destination if the resultant order is superior to the order determined above.

In FIG. 5A, the mapping program 37 examines extending the route from Atlanta 207 to the new destination New York 230. The mapping program 37 calculates the straight-line distance 501 from New York 230 to Atlanta 207. That distance 501 is compared to the variable ShortestDistance from above. Since extending the current route to new destination New York 230 would not eliminate any existing links, the entire distance 501 is compared to the added length stored in the variable ShortestDistance. If the distance 501 is shorter than the added length stored in the variable ShortestDistance, then the mapping program 37 recognizes that beginning the route at New York 230 rather than Atlanta 207 results in a more efficient route. In this example, the distance 501 is shorter than the added length stored in variable ShortestDistance. Accordingly, the mapping program 37 inserts the new destination New York 230 before Atlanta 207 and stores the length of distance 501 in the variable ShortestDistance.

In FIG. 5B, the mapping program 37 examines extending the route from Seattle 213 to the new destination New York 230. The mapping program 37 calculates the straight-line distance 503 from Seattle 213 to New York 230. That distance 503 is then compared to the variable ShortestDistance. Again, since extending the current route to new destination New York 230 would not eliminate any existing links, the entire distance 503 is compared to the added length stored in the variable ShortestDistance. However, the distance 503 is not shorter than the distance 501, and consequently the mapping program 37 does not alter the variable ShortestDistance.

Figure 6:
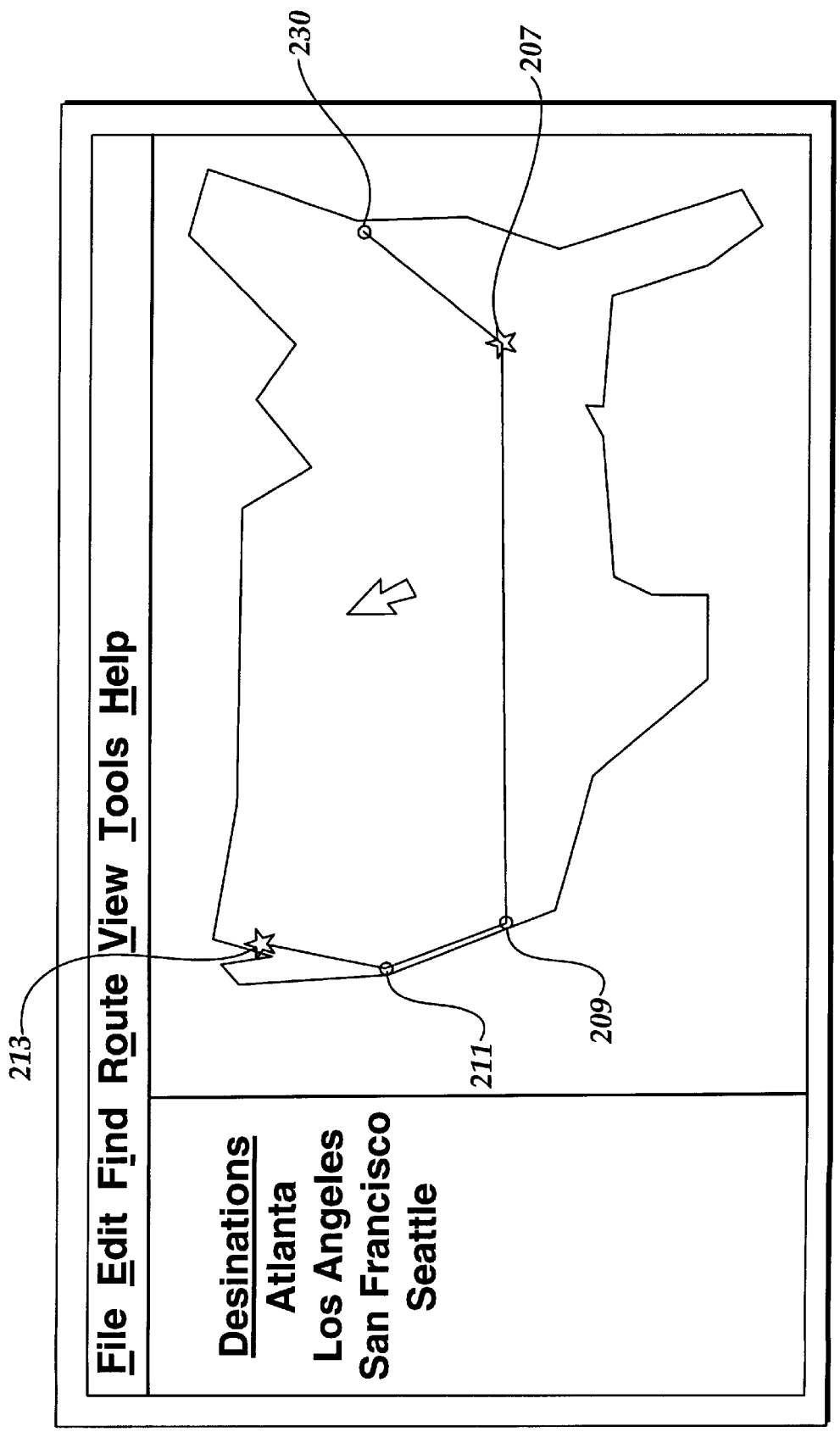
FIG. 6 is another exemplary screen display of one embodiment of the present invention illustrating a route connecting several destinations after including the new destination in the other preferable position determined through the calculations illustrated in FIGS. 5A–5B.

At this point, the mapping program 37 has evaluated each link in the existing route and determined the best location to insert the new destination New York 230. In the examples illustrated in FIGS. 5A–5B, the mapping program 37 determined that inserting the new destination New York 230 before Atlanta 207 results in the shortest increase to the total length of the continuous line connecting all of the destinations. Therefore, the mapping program 37 inserts the new destination New York 230 before Atlanta 207 in the list of existing destinations. The new route, as illustrated in FIG. 6, begins in New York 230, continues to Atlanta 207, Los Angeles 209, San Francisco 211, and ends in Seattle 213.

It should be noted that the system described above is used to identify an order in which the destinations are to be ordered. The route calculations that identify the particular roadways to get from one destination to another have not been discussed. The system described may use any conventional route calculations to identify the particular roadways between destinations once the order of the destinations has been determined.

Figure 7A:
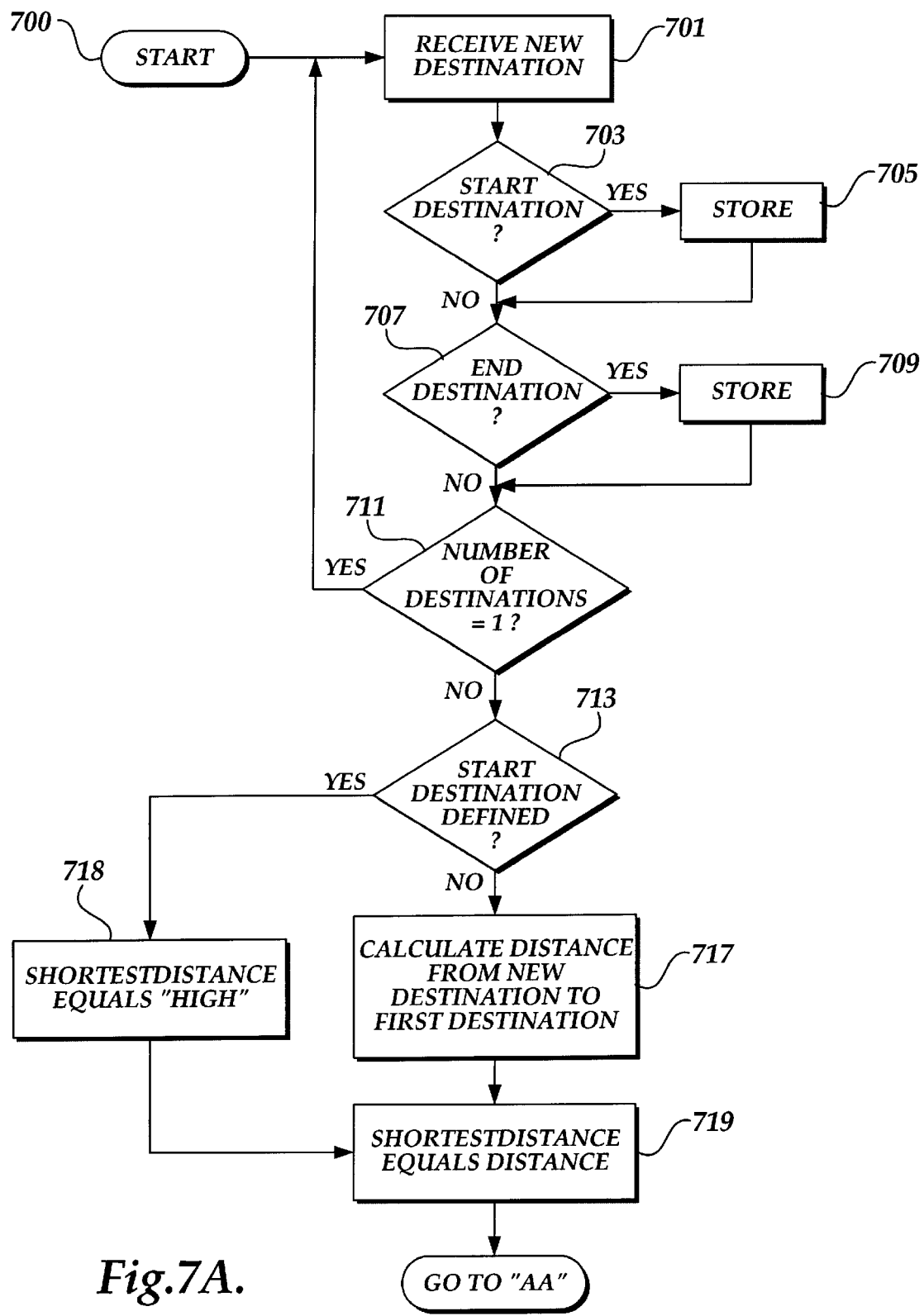
FIGS. 7A–7B are flow charts illustrating a process according to the present invention for determining the order of a list of destinations to be visited along a route as the destinations are provided.
Figure 7B:
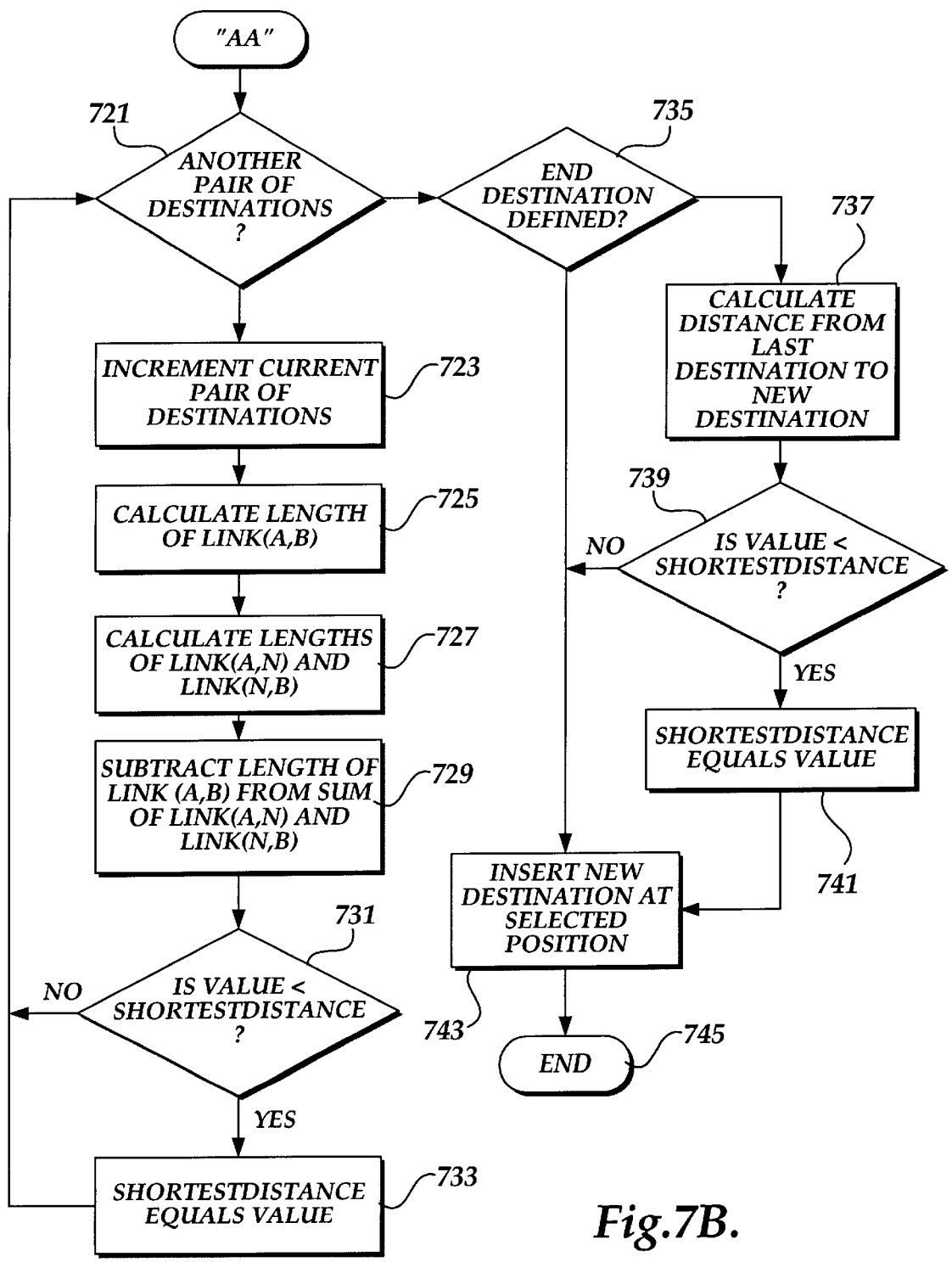

FIGS. 7A–7B are flow charts illustrating a process according to the present invention for determining the order of a list of destinations to be visited along a route as the destinations are provided. FIGS. 7A–7B, taken in conjunction with FIGS. 2, 4, or 6, depict the steps performed by the mapping program 37 when a new destination is added to order all the destinations. More specifically, in accordance with this embodiment, the mapping program 37 determines where to insert each new destination in the current order. The process begins at starting block 700 where the mapping program 37 idles awaiting input from the user identifying a new destination. Processing begins at block 701.

At block 701, the mapping program 37 receives an input identifying a new destination to be visited. Any conventional mechanism for providing that input is acceptable to identify the new destination. For example, a mouse 42 and pointer 221 may be used to graphically select the destination, or a keyboard 40 and dialog box (not shown) may be used to textually identify the destination. After the user has identified the new destination, processing proceeds to decision block 703.

At decision block 703, the mapping program 37 determines whether the new destination is the starting destination. For example, when the new destination was input, the user may have identified it as the starting destination through an option on the menu bar 204, or by selecting a particular icon on a toolbar (not shown). For the purpose of this discussion, a distinction should be drawn between the terms "starting destination" and "first destination." The term "first destination" refers to the first destination in a list of destinations. The term "starting destination" refers to the destination defined by the user as the start of the route. Consequently, a starting destination is always a first destination, but the first destination may or may not be a starting destination depending on whether the user identified the first destination as the starting destination. In short, the first destination in the route can change based on subsequent input unless the user has identified a starting destination, in which case the starting destination remains the first destination. Returning to decision block 703, if the new destination was not identified as the starting destination, processing proceeds to block 707. If the new destination was identified as the starting destination, then, at block 705, the mapping program 37 stores that information associated with the new destination, and processing proceeds to decision block 707.

At decision block 707, the mapping program 37 determines whether the new destination is an ending destination. Again, as above, a distinction should be drawn between the terms "ending destination" and "last destination." The term "last destination" refers to the last destination in a list of destinations. The term "ending destination" refers to the destination defined by the user as the end of the route. Thus, the ending destination, if defined, is always the last destination. However, if no ending destination is defined, the last destination may change based on subsequent inputs. So, if the user did not identify the new destination as the ending destination when the new destination was input, processing proceeds to decision block 711. If the new destination was identified as the ending destination, then, at block 709, the mapping program 37 stores that information associated with the new destination, and processing proceeds to decision block 711.

At decision block 711, the mapping program 37 determines whether the number of existing destinations equals one. In other words, if the new destination is the first destination provided by the user, then only one destination exists and no ordering needs to be performed. Accordingly, if the new destination is the first destination provided, the mapping program 37 begins tabulating a list of destinations with the new destination as the first destination in the list. As more destinations are added, the mapping program 37 adds them to the list in the order determined by this process. If the new destination is the first destination, processing returns to block 701 and awaits the input of another destination. If the new destination is not the first destination to be input, then processing proceeds to block 713.

At decision block 713, the mapping program 37 determines whether a destination has been identified as the starting destination at block 705. If either the new destination or any destination previously provided was identified at block 705 as the starting destination, then, at block 715, the mapping program initializes the variable ShortestDistance to an unfeasibly high number (a sentinel value), and processing proceeds to decision block 721. However, if there has not been a destination identified as the starting destination at block 705, processing proceeds to block 717.

At block 717, the mapping program 37 calculates the distance from the new destination to the first existing destination. If the process has gotten to block 717, then there is necessarily at least one existing destination already provided, and there may be many. The mapping program 37 maintains a list, as mentioned above regarding decision block 711, of the existing destinations sorted in the order in which the destinations are visited along the route. In FIG. 2, the listing portion 205 illustrates one example of such a list of destinations. Accordingly, the mapping program 37 identifies the currently-first destination in the list of existing destinations and calculates the distance between the new destination and the currently-first destination. When that distance is calculated, processing proceeds to block 719.

At block 719, the mapping program 37 initializes the variable ShortestDistance to the distance between the new destination and the currently-first destination. The mapping program 37 also associates the beginning position in the list of destinations with the value in ShortestDistance. It should be noted that block 715 and block 719 are mutually exclusive. The variable ShortestDistance is either initialized to a very high number or to the distance between the new destination and the currently-first destination, but not both. Processing then proceeds to decision block 721.

At decision block 721, the mapping program 37 determines whether a pair of existing destinations has not been tested. As mentioned above, several destinations may have been input prior to the new destination and reside on the list of existing destinations. Accordingly, the mapping program 37 systematically tests each pair of destinations in the list of existing destinations to determine the best position in which to insert the new destination. If the new destination is only the second destination to be provided by the user, then there are no pairs of existing destinations to be tested. If there are no further pairs of destinations to be tested, processing proceeds to decision block 735. However, if there is another pair of destinations yet to be tested, processing proceeds to block 723, where the process sets an identifier to that pair of destinations. Processing then continues at block 725.

At block 725, the mapping program 37 calculates the distance between the identified pair of destinations ("Link (A,B)"). At block 727, the mapping program 37 calculates the distance from one existing destination in the pair of destinations to the new destination ("Link(A,N)"), and adds to that the distance from the new destination to the other existing destination in the pair of destinations ("Link(N,B) "). At block 729, the mapping program 37 subtracts the distance calculated at block 725 from the total distance calculated at block 727. The result of that subtraction is the straight-line impact on the existing route of inserting the new destination between the current pair of destinations. With that value calculated, processing proceeds to decision block 731.

At decision block 731, the mapping program 37 determines whether the value calculated at block 729 is less than the current value of the variable ShortestDistance. When the process first passes through the loop, the value of ShortestDistance is either the distance from the new destination to the current first destination (calculated at block 717) or the high number stored at block 715. If ShortestDistance is still the initialized high number from block 715, then the value calculated at block 729 is certain to be shorter. If the value calculated at block 729 is shorter than the current value of ShortestDistance, processing proceeds to block 733, otherwise processing returns to decision block 721 which performs again as described above.

At block 733, the mapping program 37 has determined that the value calculated at block 729 is shorter than the current value of ShortestDistance. In that case, the mapping program 37 replaces the current value of ShortestDistance with the value calculated at block 729. In addition, the mapping program 37 tracks which pair of destinations corresponds to the current value of ShortestDistance. Processing then returns to decision block 721, which performs again as described above. When the mapping program 37 has tested each pair of destinations in the list of existing destinations, processing proceeds from decision block 721 to decision block 735.

At decision block 735, the mapping program 37 determines whether an ending destination was identified at block 709. If an ending destination was identified, then the mapping program 37 is not able to add the new destination to the end of the list of existing destinations and processing proceeds to block 743. However, if no ending block was identified at block 709, then the mapping program 37 is free to add the new destination to the end of the list of existing destinations. In that case, processing proceeds to block 737.

At block 737, the mapping program 37 calculates the distance from the new destination to the currently-last destination in the list of existing destinations. Processing then proceeds to decision block 739.

At decision block 739, the mapping program 37 determines whether the distance calculated at block 737 is shorter than the current value of ShortestDistance. If not, then processing proceeds to block 743. However, if the distance calculated at block 737 is shorter than the current value of ShortestDistance, then processing proceeds to block 741.

At block 741, the mapping program 37 replaces the value of ShortestDistance with the value calculated at block 737. The mapping program 37 also identifies the ending position as the preferable position for the new destination. Processing then proceeds to block 743.

When the process reaches block 743, the mapping program 37 has completed evaluating each successive pair of destinations in the list of existing destinations to determine an appropriate position in which to insert the new destination. Also, if possible, the mapping program has evaluated the beginning position and the ending position as possible positions in which to insert the new destination. After performing those evaluations, the variable ShortestDistance reflects the shortest straight-line length by which route will be affected by adding the new destination. The position in the list of destinations associated with the value in the variable ShortestDistance reflects the best position in which to insert the new destination. Consequently, at block 743, the mapping program 37 inserts the new destination at the current position in the list of existing destinations corresponding to the value in ShortestDistance. Processing then proceeds to ending block 745 where the process terminates.

At ending block 745, the mapping program 37 may recalculate the portion of the route affected by inserting the new destination. This recalculation may be automatic or may be delayed until triggered by the user. Recalculating the route should be distinguished from performing the calculations to order the destinations. Recalculating the route involves determining the particular roadways that form the route rather than the order in which destinations are visited. Moreover, only the portion of the route affected by inserting the new destination need be recalculated. For example, if the new destination was inserted between an existing third destination and an existing fourth destination, only that portion of the route between the existing third and fourth destinations need be recalculated to include the new destination. The portion of the route connecting the existing first and second destinations need not be recalculated. Likewise, any portions of the route located after the fourth destination need not be recalculated.

From the foregoing description, those skilled in the art will appreciate that the process illustrated in FIGS. 7A–7B enables the mapping program 37 to dynamically order destinations as each destination is input, beginning with the first destination. As a new destination is input, the mapping program 37 determines a position in the order of current destinations in which to insert the new destination. That determination is made by identifying a position in the existing order of destinations in which the new destination may be inserted and that results in the shortest increase to the straight-line length of the route. In the disclosed embodiment, the mapping program seeks to limit the number of changes made to the existing order of locations to one. In that way, the calculations made to determine an appropriate position for the new destination are minimized.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computer mapping program, a method for identifying an order for destinations to be visited by a route, comprising:
    receiving an indication that a new destination is to be added to the route;
    identifying a preferable position in a plurality of possible positions in a list of existing destinations to insert the new destination, the list of existing destinations being sorted in the order in which the route visits each destination, the preferable position minimizing the length of a continuous line connecting all the destinations to be visited along the route; and
    inserting the new destination in the identified position.

2. The method of claim 1, wherein identifying the position comprises:
    evaluating each pair of destinations in the list of destinations to determine the impact on the length of the continuous line resulting from inserting the new destination between each pair of destinations; and
    identifying the pair of destinations having the lowest impact on the length of the continuous line as the preferable position.

3. The method of claim 2, wherein the impact of inserting the new destination between one pair of destinations comprises a length by which the continuous line connecting all the destinations would be extended if the new destination were inserted between the one pair of destinations.

4. The method of claim 3, wherein the impact of inserting the new destination between the one pair of destinations is calculated by the method of:
    calculating a distance from a first existing destination in the one pair of destinations to the new destination to achieve a first value;
    calculating a distance from a second existing destination in the one pair of destinations to the new destination to achieve a second value;
    calculating a distance between the first existing destination and the second existing destination to achieve a third value; and
    subtracting the third value from the sum of the first value and the second value to determine the impact of inserting the new destination between the first existing destination and the second existing destination.

5. The method of claim 2, wherein identifying the position comprises:
    evaluating a terminal position in the list of destinations to determine an impact on the length of the continuous line of inserting the new destination at the terminal position;
    determining if the impact of the terminal position on the length of the continuous line is preferable to the impact of the pair of destinations on the length of the continuous line; and
    if the impact of the terminal position on the length of the continuous line is preferable to the impact of the pair of destinations on the length of the continuous line, identifying the terminal position as the preferable position.

6. The method of claim 5, wherein the terminal position includes a beginning position located prior to a first existing destination in the list of existing destinations.

7. The method of claim 5, wherein the terminal position includes an ending position located after a last existing destination in the list of existing destinations.

8. The method of claim 5, wherein:
    evaluating the terminal position comprises calculating the distance from the new destination to an existing terminal position in the list of existing destinations; and
    determining if the impact of the terminal position is preferable to the impact of the pair of destinations comprises comparing the distance from the new destination to the existing terminal position to the impact of the pair of destinations on the length of the continuous line.

9. The method of claim 1, wherein the plurality of possible positions includes a beginning position located prior to a first existing destination in the list of existing destinations.

10. The method of claim 1, wherein the plurality of possible positions includes an ending position located after the last existing destination in the list of existing destinations.

11. The method of claim 1, wherein each possible position in the plurality of possible position is a position located between subsequent destinations in the plurality of possible destinations.

12. In a computer mapping program having a plurality of destinations and a plurality of links, each link being a straight line joining two consecutive destinations in the plurality of destinations, the plurality of destinations being ordered sequentially from a first destination to a last destination, the order of the plurality of destinations corresponding to the order in which a continuous line visits each destination, a method of adding a new destination to the plurality of destinations, comprising:
    (a) identifying a link in the plurality of links as a current link to be tested;
    (b) calculating the impact of inserting the new destination between the two consecutive destinations joined by the current link, by:
        (i) calculating a distance from one of the two consecutive destinations to the new destination to achieve a first value;

(ii) calculating a distance from the other consecutive destination to the new destination to achieve a second value;
(iii) calculating a distance between the two consecutive destinations to achieve a third value; and
(iv) subtracting the third value from the sum of the first value and the second value to achieve the impact of inserting the new destination between the two consecutive existing destinations;

(c) if any links have not been tested in the plurality of links, identifying an untested link as the current link and repeating (b); and (d) when all of the links have been tested, identifying the link resulting in the lowest impact as a replaceable link.

13. The method of claim 12, further comprising:
(e) inserting the new destination in the plurality of destinations between the two destinations joined by the replaceable link.

14. The method of claim 12, further comprising:
(e) calculating an impact of inserting the new destination at a terminal position in the order of the plurality of destinations by calculating the distance from the new destination to the existing destination at the terminal position in the order of the plurality of destination; and
(f) if the impact of inserting the new destination at the terminal position is less than the lowest impact of inserting the new destination between two consecutive destinations, inserting the new destination at the terminal position in the order of the plurality of destinations.

15. The method of claim 14, wherein the terminal position comprises a beginning position prior to the first destination in the plurality of destinations.

16. The method of claim 14, wherein the terminal position comprises an ending position after the last destination in the plurality of destinations.

17. A computer-readable medium having computer executable instructions for ordering a list of destinations to be visited along a route in response to a new destination being provided, which when executed, comprise:
receiving an indication that a new destination is to be added to the route;
identifying a preferable position in the list of destinations to insert the new destination, the list of existing destinations being sorted in the order in which the route visits each destination, the preferable position minimizing the length of a continuous line connecting all the destinations to be visited along the route; and
inserting the new destination in the identified position.

18. The computer-readable medium of claim 17, wherein identifying the preferable position comprises:
if the list of destinations comprises two or more existing destinations, evaluating each pair of destinations in the list of destinations to determine, for each pair of destinations, an impact on the route of inserting the new destination between each pair of destinations; and
identifying the pair of destinations having the lowest impact on the route as the preferable position.

19. The computer-readable medium of claim 18, wherein if the list of destinations comprises fewer than two existing destinations, adding the new destination to a terminal position in the list of destinations.

20. The computer-readable medium of claim 18, wherein the impact on the route of inserting the new destination between one pair of destinations comprises a straight-line distance by which the distance between the one pair of destinations is exceeded by the sum of a distance from the new destination to one destination in the pair of destinations and a distance from the new destination to the other destination in the pair of destinations.

21. The computer-readable medium of claim 18, further comprising:
determining if inserting the new destination at a terminal position in the list of destinations results in a lesser impact on the route; and
if inserting the new destination at the terminal position results in a lesser impact on the route, inserting the new destination at the terminal position.

22. The computer-readable medium of claim 21, further comprising, if inserting the new destination at the terminal position results in a greater impact on the route, inserting the new destination at the preferable position.

23. The computer-readable medium of claim 22, wherein the terminal position comprises a beginning position prior to a first destination in the list of destinations.

24. The computer-readable medium of claim 22, wherein the terminal position comprises an ending position after a last destination in the list of destinations.

* * * * *

UNITED STATES PATENT AND TRADEMARK OFFICE
CERTIFICATE OF CORRECTION

PATENT NO.  : 6,182,008 B1
DATED       : January 30, 2001
INVENTOR(S) : M.A. Nikiel et al.

It is certified that error appears in the above-identified patent and that said Letters Patent is hereby corrected as shown below:

Column 5,
Line 3, "startup," should read -- start-up, --

Column 14,
Line 48 (claim 11, line 2), "of possible position" should read -- of possible positions --

Column 15,
Line 25 (claim 14, line 6), "destination; and" should read -- destinations; and --

Signed and Sealed this

Thirtieth Day of October, 2001

*Attest:*

NICHOLAS P. GODICI
*Attesting Officer*    Acting Director of the United States Patent and Trademark Office